United States Patent
Lisseman et al.

(10) Patent No.: US 9,513,707 B2
(45) Date of Patent: Dec. 6, 2016

(54) SYSTEMS AND METHODS FOR LOCKING AN INPUT AREA ASSOCIATED WITH DETECTED TOUCH LOCATION IN A FORCE-BASED TOUCHSCREEN

(71) Applicant: TK Holdings Inc., Auburn Hllls, MI (US)

(72) Inventors: Jason Lisseman, Shelby Township, MI (US); David Andrews, Ortonville, MI (US)

(73) Assignee: TK Holdings Inc., Auburn Hills, MI (US)

( * ) Notice: Subject to any disclaimer, the term of this patent is extended or adjusted under 35 U.S.C. 154(b) by 22 days.

(21) Appl. No.: 14/509,535

(22) Filed: Oct. 8, 2014

(65) Prior Publication Data
US 2015/0097795 A1    Apr. 9, 2015

Related U.S. Application Data

(60) Provisional application No. 61/888,322, filed on Oct. 8, 2013, provisional application No. 61/891,231, filed on Oct. 15, 2013.

(51) Int. Cl.
*G06F 3/041* (2006.01)
*G06F 3/01* (2006.01)
(Continued)

(52) U.S. Cl.
CPC .................. *G06F 3/016* (2013.01); *B62D 1/04* (2013.01); *G06F 3/0414* (2013.01);
(Continued)

(58) Field of Classification Search
None
See application file for complete search history.

(56) References Cited

U.S. PATENT DOCUMENTS 6,429,846 B2    8/2002    Rosenberg et al.
6,636,197 B1    10/2003   Goldenberg et al.
(Continued)

FOREIGN PATENT DOCUMENTS

EP    1607850 A2    12/2005
KR    1020100129424    12/2010
(Continued)

OTHER PUBLICATIONS

Office Action mailed Sep. 30, 2015 in U.S. Appl. No. 14/509,493, filed Oct. 8, 2014.
(Continued)

*Primary Examiner* — Joseph Feild
*Assistant Examiner* — Emily Frank
(74) *Attorney, Agent, or Firm* — Meunier Carlin & Curfman LLC

(57) ABSTRACT

A method for locking an input area associated with a force-based touch interface comprises detecting a first touch value associated with a first user interaction with a first area of a touch interface. The first touch value includes information indicative of a location of the first area of the touch interface. The method also comprises establishing a first virtual input area based on the location, wherein a boundary associated with first virtual input area is contained within a boundary defined by the touch interface. The method also comprises detecting a second touch value associated with a second user interaction with the touch interface, and determining that a location associated with the second touch value is within the first virtual input area. The method also involves generating a control signal for causing execution of a first function, based on the determination that the second touch value is within the first virtual input area.

19 Claims, 11 Drawing Sheets

(51) Int. Cl.
*B62D 1/04* (2006.01)
*G06F 3/16* (2006.01)

(52) U.S. Cl.
CPC ............ *G06F 3/0418* (2013.01); *G06F 3/167* (2013.01); *G06F 2203/04104* (2013.01); *G06F 2203/04106* (2013.01)

(56) References Cited

U.S. PATENT DOCUMENTS

| | | |
|---|---|---|
| 6,933,920 B2 | 8/2005 | Lacroix et al. |
| 8,698,764 B1 | 4/2014 | Karakotsios et al. |
| 2004/0195031 A1 | 10/2004 | Nagasaka |
| 2005/0021190 A1 | 1/2005 | Worrell et al. |
| 2005/0156892 A1 | 7/2005 | Grant |
| 2006/0109256 A1 | 5/2006 | Grant |
| 2006/0262103 A1 | 11/2006 | Hu |
| 2006/0284839 A1 | 12/2006 | Breed |
| 2007/0097073 A1 | 5/2007 | Takashima et al. |
| 2007/0287494 A1 | 12/2007 | You et al. |
| 2008/0012837 A1 | 1/2008 | Marriott et al. |
| 2008/0062145 A1 | 3/2008 | Shahoian |
| 2009/0001855 A1 | 1/2009 | Lipton |
| 2009/0125811 A1 | 5/2009 | Bethurum |
| 2009/0153340 A1 | 6/2009 | Pinder et al. |
| 2009/0189749 A1 | 7/2009 | Salada |
| 2010/0001974 A1 | 1/2010 | Su et al. |
| 2010/0053087 A1 | 3/2010 | Dai |
| 2010/0066512 A1 | 3/2010 | Rank |
| 2010/0200375 A1 | 8/2010 | Han et al. |
| 2010/0250066 A1 | 9/2010 | Eckstein et al. |
| 2010/0250071 A1 | 9/2010 | Pala et al. |
| 2010/0268426 A1 | 10/2010 | Pathak |
| 2010/0302177 A1 | 12/2010 | Kim et al. |
| 2011/0069021 A1 | 3/2011 | Hill |
| 2011/0109552 A1 | 5/2011 | Yasutake |
| 2011/0141052 A1 | 6/2011 | Bernstein et al. |
| 2011/0241850 A1 | 10/2011 | Bosch et al. |
| 2011/0260983 A1 | 10/2011 | Pertuit et al. |
| 2011/0267181 A1* | 11/2011 | Kildal .................... G06F 3/016 340/407.2 |
| 2011/0279380 A1 | 11/2011 | Weber et al. |
| 2012/0038468 A1 | 2/2012 | Provancher |
| 2012/0039494 A1 | 2/2012 | Ellis |
| 2012/0169663 A1 | 7/2012 | Kim et al. |
| 2012/0267221 A1 | 10/2012 | Gohng et al. |
| 2012/0267222 A1 | 10/2012 | Gohng et al. |
| 2012/0299856 A1 | 11/2012 | Hasui |
| 2013/0063380 A1* | 3/2013 | Wang ................. G06F 3/04883 345/173 |
| 2013/0093679 A1 | 4/2013 | Dickinson et al. |
| 2013/0096849 A1 | 4/2013 | Campbell et al. |
| 2013/0106691 A1 | 5/2013 | Rank |
| 2013/0113717 A1* | 5/2013 | Van Eerd ............ G06F 3/04883 345/173 |
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0222287 A1 | 8/2013 | Bae et al. |
| 2013/0222310 A1 | 8/2013 | Birnbaum et al. |
| 2015/0046825 A1* | 2/2015 | Li ........................ G06F 3/0481 715/728 |
| 2015/0097794 A1 | 4/2015 | Lisseman et al. |
| 2015/0116205 A1 | 4/2015 | Westerman et al. |
| 2015/0212571 A1 | 7/2015 | Kitada |
| 2015/0309576 A1 | 10/2015 | Tissot |

FOREIGN PATENT DOCUMENTS

| | | |
|---|---|---|
| WO | 2011008292 A1 | 1/2011 |
| WO | 2013082293 A1 | 6/2013 |

OTHER PUBLICATIONS

International Search Report and Written Opinion issued in related International Application No. PCT/US2014/059652 on Dec. 22, 2014.
International Search Report and Written Opinion issued in related International Application No. PCT/US2014/059673 on Jan. 9, 2015.
International Search Report and Written Opinion issued in related International Application No. PCT/2014/059669 on Jan. 23, 2015.
International Search Report and Written Opinion issued in related International Application No. PCT/US2014/059657 on Feb. 16, 2015.
International Search Report and Written Opinion issued in related International Application No. PCT/US2014/059639 on Feb. 24, 2015.
International Search Report and Written Opinion issued in related International Application No. PCT/US2014/040224 on Sep. 24, 2014.
Co-pending U.S. Appl. No. 14/509,598, filed Oct. 8, 2014 and its file history.
Co-pending U.S. Appl. No. 14/509,560, filed Oct. 8, 2014 and its file history.
Co-pending U.S. Appl. No. 14/509,493, filed Oct. 8, 2014 and its file history.
Office Action dated Jun. 16, 2016, received in connection with U.S. Appl. No. 14/509,493.
Co-pending U.S. Appl. No. 14/509,462, filed Oct. 8, 2014 and its file history.
Office Action dated Jun. 14, 2016, received in connection with U.S. Appl. No. 14/509,462, filed Oct. 8, 2014 and its file history.
Co-pending U.S. Appl. No. 14/509,332, filed Oct. 8, 2014 and its file history.
Office Action dated May 3, 2016, received in connection with U.S. Appl. No. 14/509,332.
Co-pending U.S. Appl. No. 14/291,845, filed May 30, 2014 and its file history.
Office Action dated Feb. 24, 2016, received in connection with U.S. Appl. No. 14/291,845.
Office Action dated Sep. 24, 2015, received in connection with U.S. Appl. No. 14/291,845.
International Preliminary Report on Patentability and Written Opinion, dated Apr. 12, 2016, received in connection with International Patent Application No. PCT/US2014/059639.
International Preliminary Report on Patentability and Written Opinion, dated Apr. 12, 2016, received in connection with International Patent Application No. PCT/US2014/059652.
International Preliminary Report on Patentability and Written Opinion, dated Apr. 12, 2016, received in connection with International Patent Application No. PCT/US2014/059657.
International Preliminary Report on Patentability and Written Opinion, dated Apr. 12, 2016, received in connection with International Patent Application No. PCT/US2014/059669.
International Preliminary Report on Patentability and Written Opinion, dated Apr. 12, 2016, received in connection with International Patent Application No. PCT/US2014/059673.
International Preliminary Report on Patentability and Written Opinion, dated Dec. 10, 2015, received in connection with International Patent Application No. PCT/US2014/040224.

\* cited by examiner

SYSTEMS AND METHODS FOR LOCKING AN INPUT AREA ASSOCIATED WITH DETECTED TOUCH LOCATION IN A FORCE-BASED TOUCHSCREEN

CROSS-REFERENCE TO RELATED APPLICATION

This application claims the benefit of U.S. Provisional Application No. 61/888,322, filed Oct. 8, 2013, and U.S. Provisional Application No. 61/891,231, filed Oct. 15, 2013, each of which is incorporated herein by reference in its entirety.

TECHNICAL FIELD

The present disclosure relates generally to a tactile haptic switch panel and, more particularly, to systems and methods for locking the relative position of a detected touch location in a force-based tactile haptic switch panel.

BACKGROUND

The recent widespread growth of feature-rich, relatively portable, and user-friendly consumer electronic devices has sparked a corresponding consumer demand for implementation of similar functionality in conventional appliances and utilitarian devices. For example, more consumers are demanding modern touchscreen interfaces in utility appliances like televisions, refrigerators, dishwashers, and washing machines. Even modern thermostats are integrating gesture-controllable, fully-networked and remotely accessible user interfaces (UIs). Even the automobile, often thought of as the quintessential utilitarian machine, has not been impervious to recent trends to incorporate as many options and features accessible to the driver as possible—from mechanical switch controls for climate, navigation, and radio systems integrated into the steering wheel, to touchscreen interfaces and camera displays integrated into the dashboard.

Although consumer demand for incorporating greater functionality into the automotive driving experience is growing rapidly, there are a number of problems with meeting such demand. First, conventional capacitive sense touchscreen technologies, such as those used in smartphones and tablet devices, while ideal for incorporating a large amount of functionality in a relatively limited space, require significant visual engagement by the driver and therefore require too long of distraction time to be implemented safely. Second, while the conventional mechanical switches and knobs that are currently in use require reduced distraction time because they don't require the driver to remove his eyes from the road, they tend to have limited flexibility, with each switch controlling a single function or feature.

One solution for combining the flexibility and versatility of touchscreen technologies while still allowing the driver to remain attentive for safely operating the vehicle involves the use of force-based haptic human-machine interfaces (HMIs). Force-based haptic HMIs typically include a sensor surface that is responsive to touch and an actuator for generating a responsive vibration (often simulating the response provided by a mechanical switch) that provides the driver with a tactile confirmation of an input on the touchscreen. These systems incorporate the haptic feedback that drivers have come to rely on of mechanical switches with the multi-touch, multifunction flexibility of touchscreen controls.

One problem with force-based haptic HMIs, particularly in automobiles and other mechanical systems, is that accidental or inadvertent touches are much more common than in conventional mechanical switches due to the inability of the driver to continuously view the touch interface while driving. Indeed, in many situations it may be hazardous for a driver to take his/her eyes off the road in order to visually engage an interactive touchscreen display for more than a couple of seconds, which may not be long enough to locate and select a user interface element associated with a desired switch function.

Furthermore, even if a desired user interface element is visually located, accidental or non-deliberate touch events may be problematic, particularly when the user is trying to activate a switch event while driving a moving vehicle. For example, a user's finger may initially touch the screen to control a function associated with the switch that is located on the steering wheel. As the user breaks visual contact with the screen, the user may inadvertently begin to drag his/her finger across the screen, potentially resulting in an erroneous detection of a separate "touch" or "release" event. Such erroneous detections can lead to added operator distraction and frustration, possibly negating many of the benefits of a multi-function haptic touchscreen.

The presently disclosed systems and methods for locking an input area associated with detected touch location in a force-based touchscreen are directed to overcoming one or more of the problems set forth above and/or other problems in the art.

SUMMARY

According to one aspect, the present disclosure is directed to a method for locking an input area associated with a force-based touch interface. The method may comprise detecting a first touch value associated with a first user interaction with a first area of a touch interface, the first touch value including information indicative of a location of the first area of the touch interface. The method may also comprise establishing a first virtual input area based on the location, wherein a boundary associated with first virtual input area is contained within a boundary defined by the touch interface. The method may further comprise detecting a second touch value associated with a second user interaction with the touch interface. The method may also comprise determining that a location associated with the second touch value is within the first virtual input area. The method may further comprise generating a control signal for causing execution of a first function based on the determination that the second touch value is within the first virtual input area.

In accordance with another aspect, the present disclosure is directed to a method for limiting an input area associated with a force-based haptic touchscreen based on a detected touch location. The method may comprise establishing a first virtual input area corresponding to a physical area of a haptic touchscreen, and detecting a first touch event associated with the first virtual input, the touch event indicative of a user interaction with a first portion of the physical area of the haptic touchscreen. The method may also comprise establishing a second virtual input area responsive to the detected touch event, the second virtual input area corresponding to the first portion of the physical area. The method may further comprise detecting a second touch event associated with the second virtual input area based on a second user interaction the physical area of the haptic touchscreen.

In accordance with another aspect, the present disclosure is directed to a force-based haptic human-machine interface.

The interface may comprise a touch plate having a touch surface and at least one force sensor coupled to the touch plate and configured to detect a force applied to the touch surface. The force-based haptic human machine interface may also comprise an actuator coupled to the touch plate and configured to deliver a mechanical output to the touch plate, and a processor coupled to the at least one force sensor and the actuator. The processor may be configured to determine a first touch value associated with a first user interaction with a first area of the touch surface, the first touch value including information indicative of a location of the first area of the touch surface. The processor may also be configured to establish a first virtual input area based on the location, wherein a boundary associated with first virtual input area is contained within a boundary defined by the touch surface. The processor may be further configured to detect a second touch value associated with a second user interaction with the touch surface, and determine that a location associated with the second touch value is within the first virtual input area. The processor may also be configured to generate a control signal for causing execution of a first function based on the determination that the second touch value is within the first virtual input area.

DETAILED DESCRIPTION

In accordance with one aspect, the present disclosure is directed to a force-based haptic switch panel that is configured to limit or lock the input area of a touch panel surface around an area associated with an initial touch detected at the surface. Accordingly, systems and methods consistent with the disclosed embodiments are configured to limit inadvertent or accidental touches by localizing the input area around an initial touch area. In certain exemplary embodiments, areas or regions that are not associated with initial touch area may be disabled, ensuring that stray or accidental touch inputs are not registered an inputs to the touch panel.

Methods and systems consistent with the disclosed embodiments may be particularly applicable in situations in which distractions divert the user's visual attention to the touch interface. Indeed, in certain disclosed embodiments, the present disclosure is directed to switch panel user interfaces that provide multi-sensory confirmations of user interactions with the switch panel. In certain other embodiments, features consistent with the present disclosure provide a solution for limiting the functional detection area to a smaller, more localized area surrounding an initial touch event.

Figure 1:
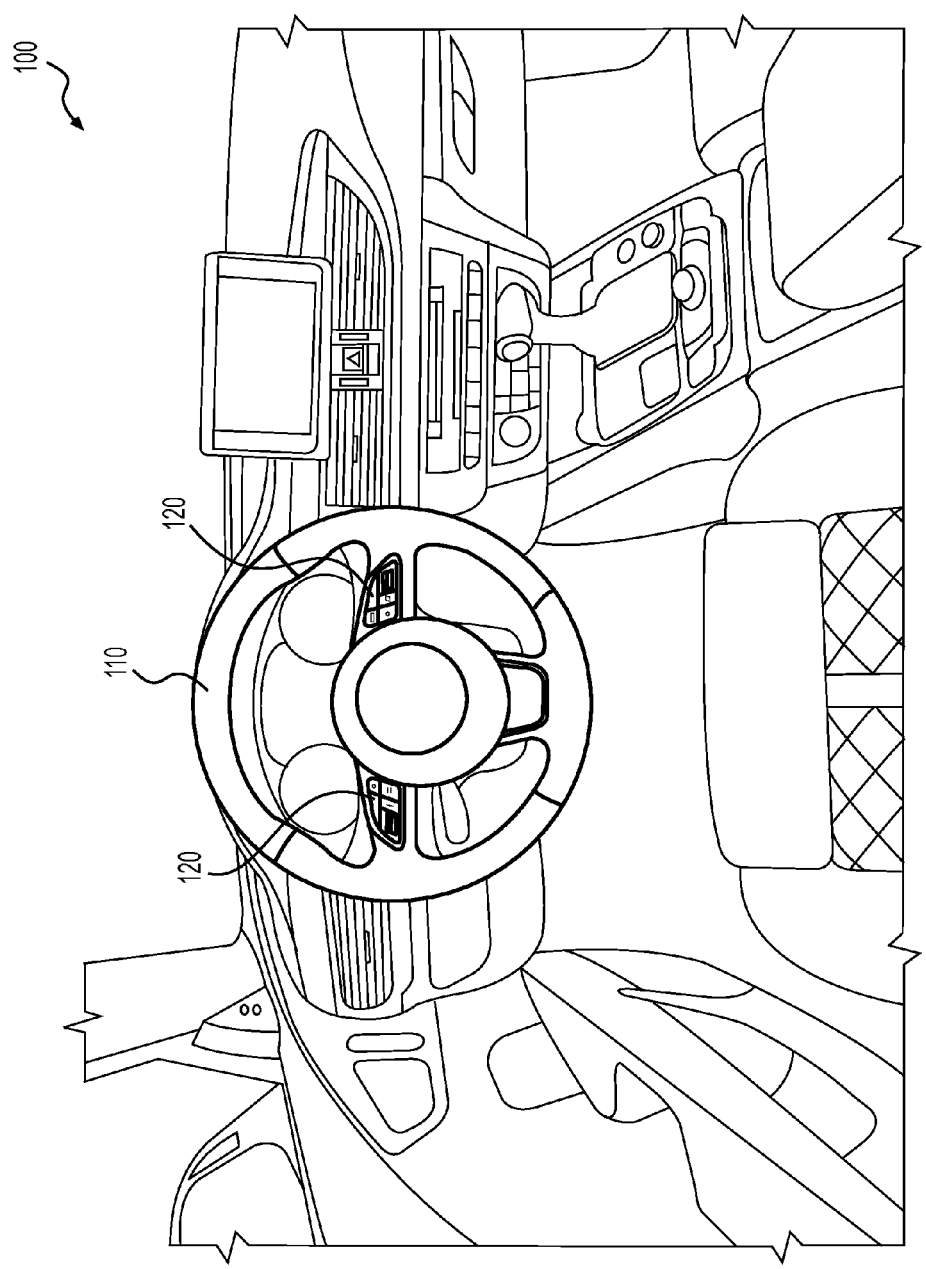
FIG. 1 illustrates an exemplary environment in which a tactile haptic switch panel consistent with certain disclosed embodiments may be implemented.

FIG. 1 illustrates an exemplary operational environment 100 in which features and methods associated with the disclosed self-calibrating tactile haptic multi-touch, multi-function switch panel may be implemented. According to one embodiment, and as illustrated in FIG. 1, operational environment 100 may include or embody a driver seat or cockpit associated with the vehicle, such as a ground-based motor vehicle. Alternatively or additionally, operational environment 100 may include or embody a driver console associated with any land, air, or sea-based transportation vehicle in which, such as a watercraft, aircraft, conventional motor vehicle, off-road vehicle, heavy construction machine, or any other type of vehicle. It is also contemplated that the presently disclosed embodiments may be employed in any stationary machine having a user console or interface, as a replacement for a conventional mechanical switch or button, such as, for example, in a vehicle training simulator, a video game console, or any other type of system that requires a human-machine interface.

FIG. 1 illustrates a plan view of an exemplary steering interface implementing a force-based switch panel (also referred to herein as a track pad interface) for vehicle control panels in accordance with the present disclosure. An example steering interface 110 can have a steering grip. A steering grip can be shaped in such a way to facilitate a driver's control of a vehicle when holding the steering grip. For example, the steering grip can include an annular ring shape with an outer contour that is essentially circular in shape. In an alternate implementation, the steering grip can define any suitable shape including, for example, circular, elliptical, square, rectangular, or any other regular or irregular shape. In an exemplary implementation, the steering grip can include a single continuous grip portion or any number of unique grip sections. Additionally the steering grip can be mounted on a fixed component such that it can be rotationally moved about a steering axis. An exemplary fixed component can include, for example, a steering column, which receives a steering spindle that extends along the steering column and serves to transmit the rotational movement of the steering grip to the wheels of the motor vehicle. Rotational movement of the steering grip may be transmitted to the wheels by mechanical and/or electrical means. In an exemplary implementation, the steering interface 110 can also include a one or more force-based tactile haptic switch panels 120, wherein each of the force-based switch panels 120 is operably coupled to the steering interface 110.

Coupling force-based switch panels 120 to the steering interface 110 provides a driver with a human-machine interface that can be configured to detect a touch or force provided by a user and determine if a switch function should or should not be activated, for example. In one embodiment, the user can be provided with a tactile or audible feedback in response to the detected input.

Figure 2:
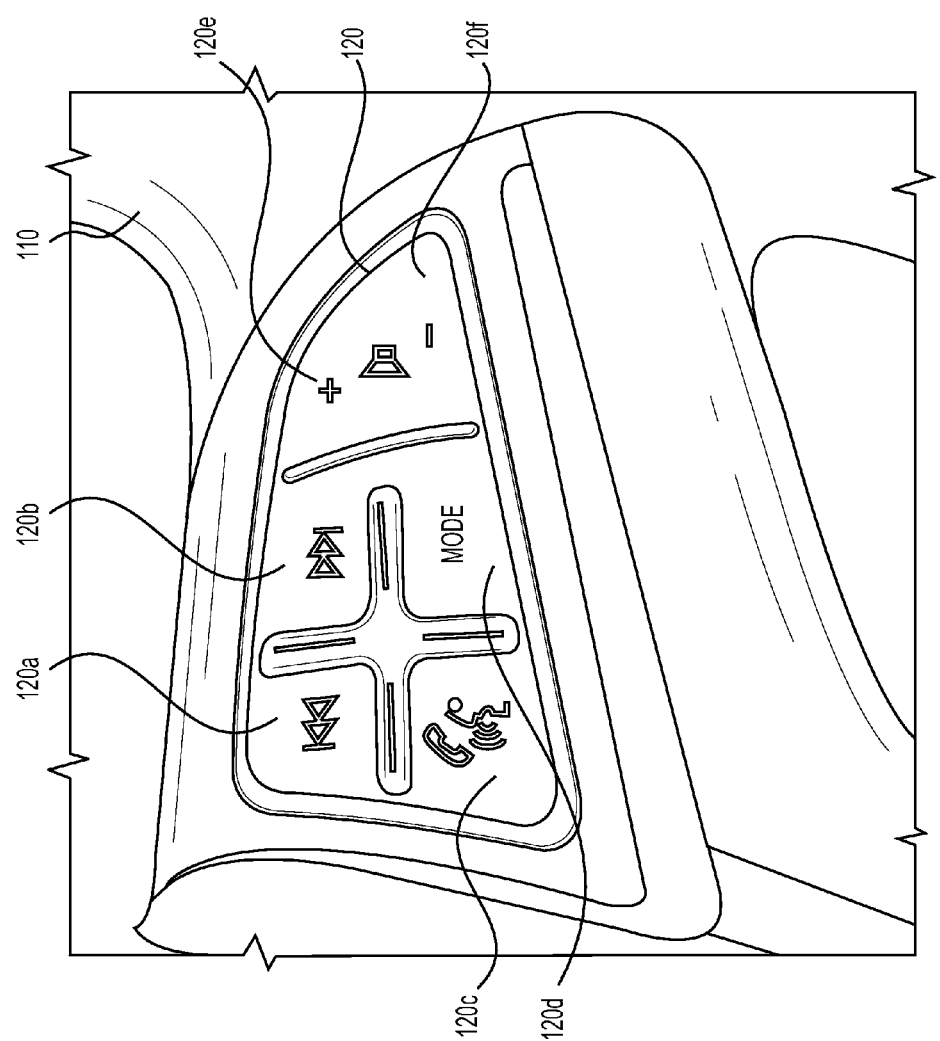
FIG. 2 illustrates an exemplary touch surface associated with a tactile haptic switch panel that is mounted within or upon a steering interface for a vehicle, in accordance with certain disclosed embodiments.

FIG. 2 illustrates a zoom view of an exemplary steering interface 110 having embedded therein a force-based switch panel 120 consistent with certain disclosed embodiments. As illustrated in FIG. 2, the force-based switch panel 120 may be embedded within a spoke that couples the rim of steering interface 100 to the center column (not shown) of the steering interface. Force-based switch panel 120 be configured to provide an interface for user control of one or more functions or systems associated with the vehicle, without requiring the user to remove his/her hands from the steering interface 110. As shown in the exemplary embodiment in FIG. 2, force-based switch panel 120 may be configured to control the audio system, which may include radio(s), media player(s), hands-free voice control system, among others. Unlike conventional mechanical switches, force-based switch panel 120 is configured to detect force values applied by the user at various locations on the switch panel, and convert these force values to electrical commands for controlling vehicle functionality.

For example, as illustrated in FIG. 2, a first area of the force-based switch panel 120 may be configured to control a "track select" operation (e.g., a "fast-rewind" or "track-rewind" 120*a* operation or "fast-forward" or "track-forward" operation 120*b*) associated with an active media player operating in the vehicle. Alternatively or additionally, a second area of the force-based switch panel 120 may be configured to activate a voice control operation 120*c* associated with the vehicle media system (or Bluetooth voice activate device that may be connected to the vehicle media system). A third area of the force-based switch panel 120 may be configured to provide a "mode select" operation, whereby a vehicle operation may, for example, select an "active" media player from among a plurality of different media player(s) (e.g., terrestrial radio, satellite radio, CD player, DVD player, digital media player (e.g., MP3, etc.)) that may be equipped or activated on the vehicle. Finally, a fourth area of the force-based switch panel may be configured to provide the user with interface options to increase 120*e* or decrease 120*f* the volume associated with the active media player.

Figure 3B:
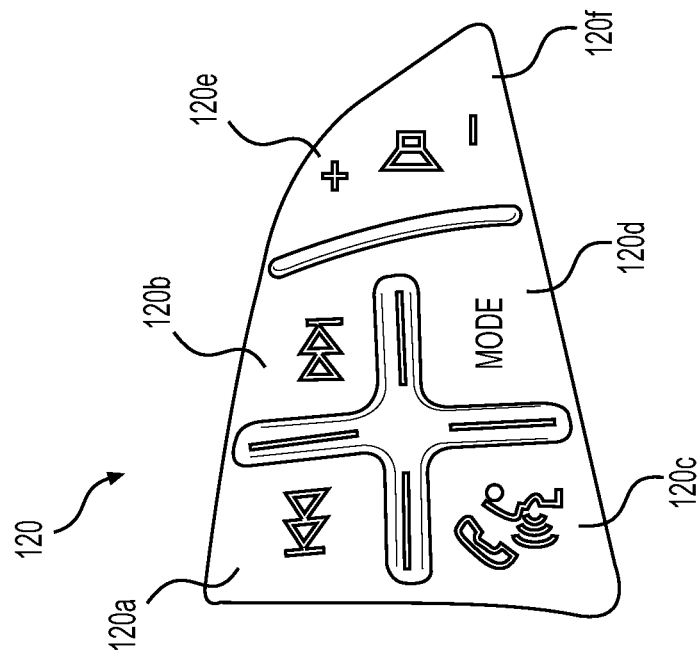
FIGS. 3A and 3B illustrate exemplary graphical layouts for one or more touch surfaces for a tactile haptic switch panel, consistent with certain disclosed embodiments.
Figure 3A:
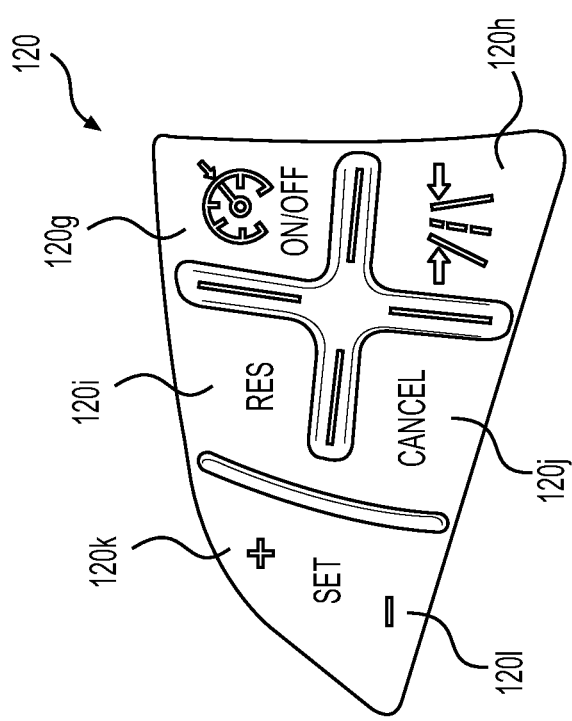

Those skilled in the art will recognize that one of the advantages of a force-based switch panel consistent with the disclosed embodiments is the flexibility of functionality that they provide. Specifically, by providing a relatively large touch sensitive area, particularly when compared with conventional mechanical switches which have a comparatively small functional footprint, the system can be customized to provide a large amount of functionality on the steering interface. Additionally, by providing haptic and audible feedback to the user in response to detection/recognition of the touch event, operator distraction is minimized. FIGS. 3A and 3B illustrate exemplary layouts for a force-based touch panel control system for a steering interface 110 that can control multiple different systems associated with the vehicle.

Although not shown in FIG. 3A or 3B, it is contemplated that force-based touch panels 120 may be embedded in the steering interface of a vehicle (as shown in FIG. 1), with FIG. 3A being disposed on a first portion of the steering interface 110 (such as on the left spoke of the steering interface 110) and FIG. 3B being disposed on a second portion of the steering interface 110 (such as on the right spoke of the steering interface 110). As explained above with respect to FIG. 2, FIG. 3B may embody a force-based switch panel 120 for controlling an audio system. As such, FIG. 3B will not be explained in further detail here.

FIG. 3A may include or embody a force-based switch panel 120 that is configured to provide the user with options for controlling certain automatic drive features (e.g., cruise control, automatic lane detection/warning system, etc.) associated with the vehicle. For example, as illustrated in FIG. 3A, a first area of force-based switch panel 120 may be configured to activate the cruise control function of the vehicle 120*g*. A second area of force-based switch panel 120 may be configured to set the cruise control speed (and subsequently increase 120*k* or decrease 120*l* the speed). Third and fourth areas of the force-based sensor 120 may be configured to resume 120*i* and cancel 120*j* cruise control functionality. Finally, a fifth area of the force-based switch panel 120 may be configured to control/enable/disable, the automatic lane detection and/or warning system of the vehicle.

It should be noted that, although FIGS. 3A and 3B illustrate certain exemplary configurations of force-based switch panels 120, such embodiments should not be construed as limiting. Indeed, other configurations of force-based switch panels 120 that may be used to control various other systems associated with the vehicle may be implemented without departing from the scope of the present disclosure. In fact, the processes, methods, and system described in connection with the presently-disclosed force-based haptic switch panels 120 can be programmed to control most any functionality where a force-based detection-type user interface may be implemented. The configuration of the force-based switch panel 120 will be described in further detail below.

A force-based switch panel 120 can be any user interface device that includes a sensor configured to change at least one electrical property in response to a touch or force applied to a touch surface of the switch panel 120. A touch, also known as a touch event, can be for example a physical contact that occurs when a driver in a vehicle uses their hand (gloved or ungloved) to apply a force to force-based switch panel 120. A force-based switch panel 120, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

As will be explained in further detail below, the force-based switch panel 120 can include a two-dimensional array of force sensors, where each force sensor includes conductors and electrodes and is in at least partial contact with a touch surface positioned over the array. In one embodiment the force-based switch panel 120 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 4:
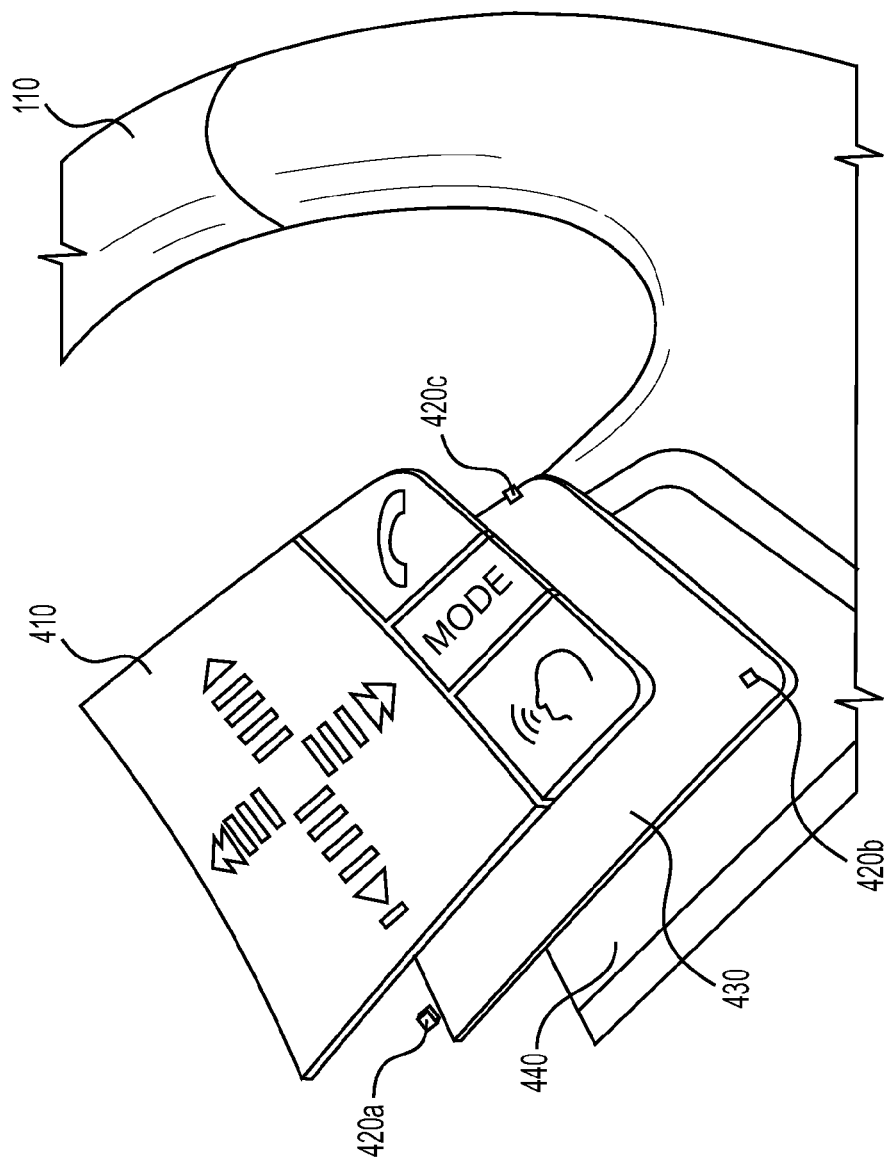
FIG. 4 provides a prospective exploded view of certain structural and functional layers of a tactile haptic switch patent, in accordance with certain disclosed embodiments.

For example, FIG. 4 provides a prospective exploded view showing certain components of a basic force-based switch panel 120 that is configured consistent with the disclosed embodiments. As illustrated in FIG. 4, force-based switch panel 120 may include a touch plate 410 having a touch surface, at least one force sensor 420a, 420b, 420c, operatively coupled to the touch plate and configured to detect a force applied to the touch surface, and a circuit board 430 disposed beneath the force sensor and configured to provide structural support for the force-based switch panel 120 and deliver electrical signals between the force sensors 420a, 420b, 420c and a corresponding processing device (e.g., controller) associated with the force-based switch panel 120. The force-based switch panel 120 may be configured for disposal within a housing 440 that can be situated within a corresponding void within steering interface 110. More detailed configurations of force-based switch panels consistent with the disclosed embodiments are illustrated in FIG. 5.

Figure 5:
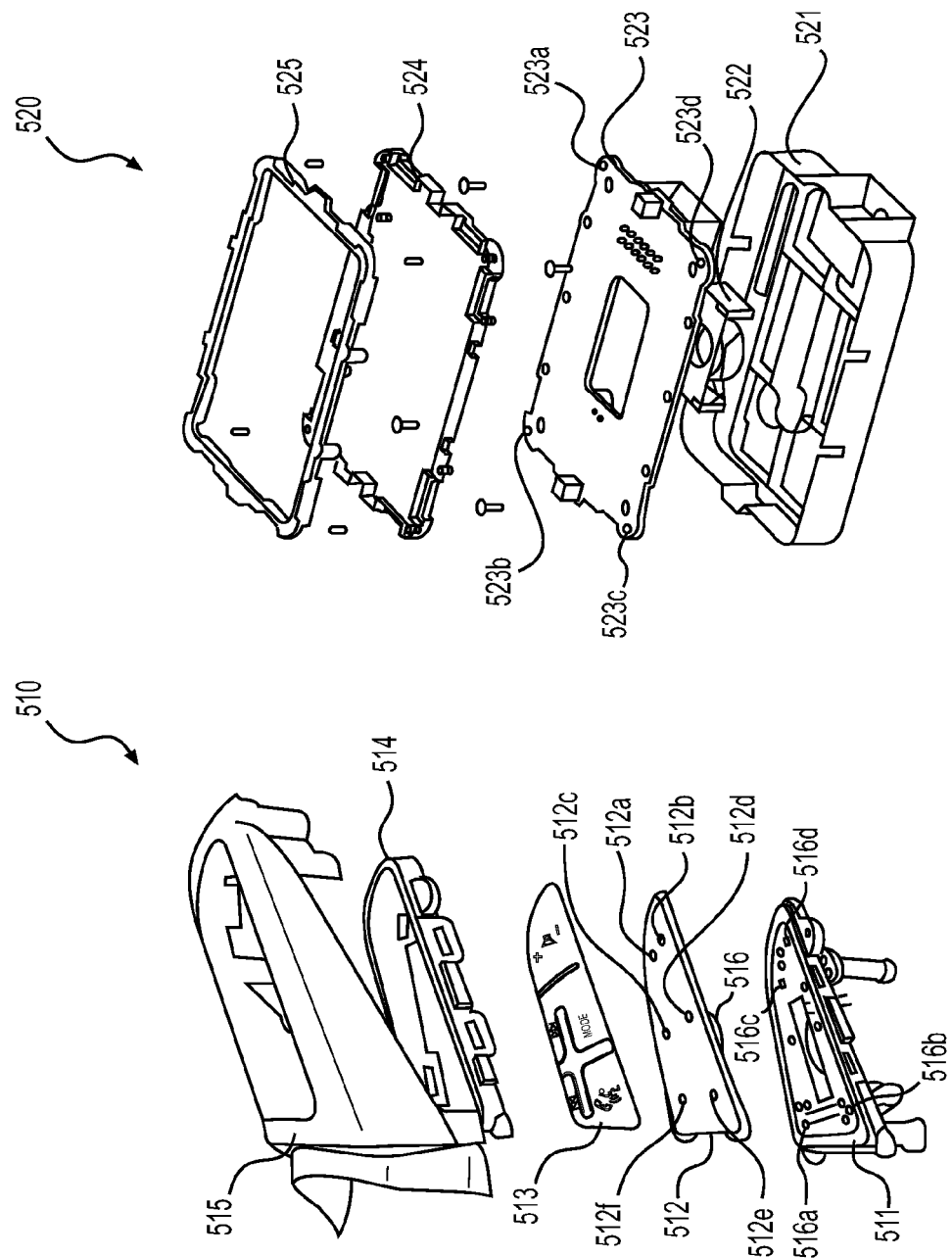
FIG. 5 provides alternative prospective exploded views of certain structural and functional layers of a tactile haptic switch patent, in accordance with certain disclosed embodiments.

FIG. 5 illustrates cross-sectional, exploded views of alternate shapes and packaging methods embodiments of a force-based switch panel 120. On the left, an exemplary force-based switch panel 510 illustrated with packaging for implementing in a triangular shape steering interface 110 of a vehicle. On the right, an exemplary force-based switch panel 520 is illustrated with packaging for implementing in a rectangular shape steering interface 110 of a vehicle.

Both embodiments provide a force-based switch panel 510 (or 520) that includes a two-dimensional array of force sensors 516a-516d (or 523a-523d) arranged to have a geometric shape having a width and a length. For example, the array of force sensors 516a-516d (or 523a-523d) may have a width or length that is 8 mm or larger. In another example, the array of force sensors 516a-516d (or 523a-523d) may have a width or length that is less than 8 mm. In one embodiment, force-based switch panel 510 (or 520) can have a depth that is 0.5 mm or less. In another example, the force-based switch panel 510 (or 520) can have a depth that is greater than 0.5 mm. While the array of force sensors 523a-523d that is shown in the force-based switch panel 520 of FIG. 5 has a rectangular shape, it is to be appreciated that this is for illustrative purposes only and the two-dimensional array of force sensors can have shapes such as circular, oval, square, rectangular, triangular and irregular shapes (such as the array of force sensors 516a-516d of force-based switch panel 510 of FIG. 5).

Both of force-based switch panels 510, 520 shown in FIG. 5 comprise a touch interface plate 512 (or 524) positioned over the array of force sensors 516a-516d (or 523a-523d). The touch interface plate 512 (or 524) includes an upper surface and a lower surface that opposes the upper surface. The touch interface plate 512 (or 524) passes touch forces incident on the upper surface through to one or more force sensors 516a-516d (or 523a-523d) of the array of force sensors disposed adjacent the lower surface. According to some embodiments, such as that illustrated in connection with force-based switch panel 510, a "skin" 513 having a plurality of backlightable icons may be overlaid atop touch interface plate 512. In such embodiments, touch interface plate may include a plurality of transparent or translucent passages 512a-512f for light to from LEDs (now shown) to pass through, thereby lighting the backlightable icons of skin 512.

According to various implementations, the touch interface plate 512 (or 524) can embody any touch-sensitive deformable member that can pass at least part of the forces from a user through the touch interface plate 512 (or 524) to one or more force sensors 516a-516d (or 523a-523d) of the array of force sensors and allows light to pass through at least a portion of the interface plate 512 (or 524). For example, the touch interface plate 512 (or 524) can be comprised of polycarbonate (PC), acrylic, PC-acrylonitrile butadiene styrene (ABS), or other plastic material, glass, rubber, other suitable materials, or combinations thereof. According to certain implementations, the thickness of the material is selected to provide a low mass but provide sufficient thickness to allow light to pass through efficiently and provide sufficient coupling to the light source(s). The material should also be sufficiently stiff to withstand the forces being applied to the upper surface without too much distortion. For example, the thickness of the material for the touch interface plate may be at least about 0.2 mm. In some implementations, the thickness of the touch interface plate may be reduced (e.g., at least about 0.1 mm) when a light altering film is disposed on a surface thereof to assist with directing the light through the material and provide some structural stiffness.

Generally, the force sensors 516a-516d (or 523a-523d) are connected to or integrated with a lower housing 511 (or base surface 523). For example, the lower housing 511 (or base surface 523) may include a printed circuit board (PCB) used to electronically communicate information or power to and from the force sensors 516a-516d (or 523a-523d) in the form of electrical signals. In various embodiments, the lower housing 511 (or base surface or 523) can further include electronic circuit components such as resistors, capacitors, diodes, LEDs, transmitters, receivers, and the like, alone with electrical interconnects for connecting the various components together. And, in one embodiment, the lower housing 511 (or base surface or 523) includes the printed circuit board on which the processor (not shown in FIG. 5) is disposed, thus electrically connecting the force sensors 516a-516d (or 523a-523d) with the processor through the lower housing 511 (or base surface 523).

It is contemplated that additional and/or different components may be included as part of the force-based switch panel 510 (or 520). For example, force-based switch panel 510 (or 520) may include one or more components for packaging the touch interface plate 512 (or 524), one or more force sensors 516a-516d (or 523a-523d), lower housing 511 (or base surface 523), and feedback actuator 516 (or 522) together as part of a single user-interface component. In one embodiment, force-based switch panel 510 may include upper and lower housing components 515 and 511, respectively, for securing the force-based switch panel 510 within a hub of a steering interface 110. Alternatively, force-based switch panel 520 may include upper and lower housing components 525 and 521, respectively, for packaging the force-based switch panel 520 as part of a single user-interface input device.

Figure 6:
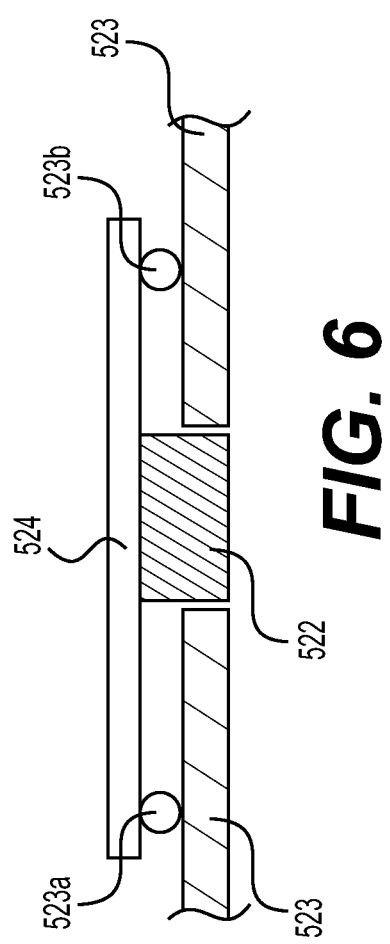
FIG. 6 provides a cross-sectional block diagram of certain exemplary components associated with a tactile haptic switch panel, consistent with certain disclosed embodiments.
Figure 7:
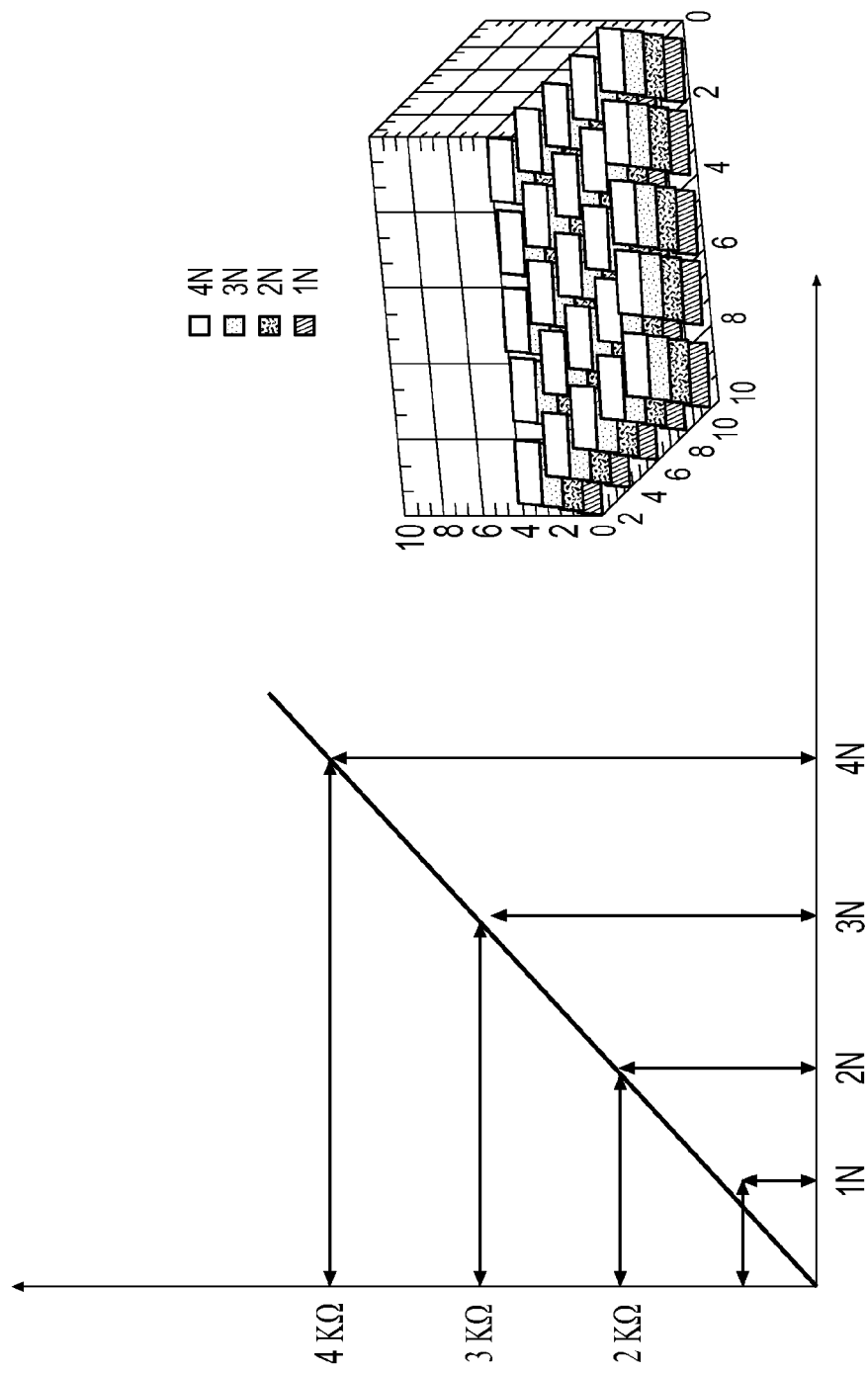
FIG. 7 provides graphs depicting exemplary force and location configuration values associated with a user interface layout for a multi-function tactile haptic switch panel, in accordance with certain disclosed embodiments.

In certain embodiments consistent with the present disclosure, the force-based switch panel may be constructed so as to provide haptic and/or audible feedback in response to a detected input signal. FIG. 6 provides a cross-sectional diagram of certain components associated with a force-based switch panel, consistent with certain disclosed embodiments. As illustrated in FIG. 6, the force-based switch panel may include a touch plate 524 having first (topside of touch plate 524) and second (underside of touch plate 524) surfaces. In this configuration, the first surface may embody a touch surface for received touch inputs from a user.

The force-based haptic switch panel may also include a circuit board 523 having a plurality of force sensors 523a, 523b electrically coupled thereto. As shown in FIG. 6, the force sensors 523a, 523b may be disposed between the circuit board 523 and the second (e.g., underside) surface of the touch plate 524, such that each force sensor is configured to measure a corresponding portion of a force applied to the touch surface of the touch plate.

The force-based haptic switch panel may include an actuator 522 that is affixed to the second (underside) surface of the touch plate 524. The actuator 522 may be configured to deliver a mechanical output to the touch plate. Non-limiting examples of mechanical outputs may include any mechanical output, such as a vibration, that may can be delivered to a surface of the touch plate 524 and perceived by the user.

Actuator 522 may include or embody any suitable device for converting electrical energy to a mechanical output, including those that can be perceived by a user of force-based switch panel. Non-limiting examples of such actuators include acoustic actuators, rotational motors, vibrational actuators, piezoelectric resonators, linear resonant actuators, or eccentric rotating mass motors. IN certain embodiments, acoustic actuators may be used to provide both mechanical vibration and audible outputs simultaneously.

According to the embodiment illustrated in FIG. 6, the circuit board 523 may comprise a passage for allowing a portion of the actuator 522 to pass therethrough. Such a passage reduces the overall depth or thickness of the force-based switch panel while allowing the actuator to be mounted directly to the underside of the touch plate 524, increasing the amount of energy that is delivered to the touch plate. The actuator may be configured to deliver different levels of haptic feedback, based on the input provided by a processor or controller associated with the force-based switch panel.

Force-based switch panel 120 may also include a controller or processor-based computing system that is configured to receive values indicative of applied force from the force sensors and determine, based on the magnitude and location of the applied force (relative to the touch surface) which function of the vehicle that the user is trying to control. Indeed, force-based switch panel may include one or more hardware and/or software components configured to execute software programs.

Such a controller device may include one or more hardware components such as, for example, a central processing unit (CPU) or microprocessor, a random access memory (RAM) module, a read-only memory (ROM) module, a memory or data storage module, a database, one or more input/output (I/O) devices, and an interface. Alternatively and/or additionally, controller may include one or more software media components such as, for example, a computer-readable medium including computer-executable instructions for performing methods consistent with certain disclosed embodiments. It is contemplated that one or more of the hardware components listed above may be implemented using software. For example, storage may include a software partition associated with one or more other hardware components of controller. The controller may include additional, fewer, and/or different components than those listed above. It is understood that the components listed above are exemplary only and not intended to be limiting.

CPU may include one or more processors, each configured to execute instructions and process data to perform one or more functions associated with controller. CPU may be communicatively coupled to RAM, ROM, storage, database, I/O devices, and interface. CPU may be configured to execute sequences of computer program instructions to perform various processes, which will be described in detail below. The computer program instructions may be loaded into RAM for execution by CPU.

RAM and ROM may each include one or more devices for storing information associated with an operation of networking device and/or CPU. For example, ROM may include a memory device configured to access and store information associated with the controller, such as force threshold levels associated with the force-based switch panel. RAM may include a memory device for storing data associated with one or more operations of CPU. For example, ROM may load instructions into RAM for execution by CPU.

Storage may include any type of mass storage device configured to store information that CPU may need to perform processes consistent with the disclosed embodiments. For example, storage may include one or more magnetic and/or optical disk devices, such as hard drives, CD-ROMs, DVD-ROMs, or any other type of mass media device. Alternatively or additionally, storage may include flash memory mass media storage or other semiconductor-based storage medium.

Database may include one or more software and/or hardware components that cooperate to store, organize, sort, filter, and/or arrange data used by controller and/or CPU. CPU may access the information stored in database to in order to identify, for example, a particular function associated with a force input value. It is contemplated that database may store additional and/or different information than that listed above.

I/O devices may include one or more components configured to communicate information with a component or user associated with controller. For example, I/O devices may include a console with an integrated keyboard and mouse to allow a user to input parameters associated with the controller. I/O devices may also include a display including a graphical user interface (GUI) for providing a network management console for network administrators to configure networking device. I/O devices may also include peripheral devices such as, for example, a printer for printing information associated with networking device, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network performance results.

Interface may include one or more components configured to transmit and receive data via a communication network, such as the Internet, a local area network, a workstation peer-to-peer network, a direct link network, a wireless network, or any other suitable communication platform. For example, interface may include one or more modulators, demodulators, multiplexers, demultiplexers, network communication devices, wireless devices, antennas, modems, and any other type of device configured to enable data communication via a communication network. According to one embodiment, interface may be coupled to or include wireless communication devices, such as a module or modules configured to transmit information wirelessly using Wi-Fi or Bluetooth wireless protocols.

Figure 8A:
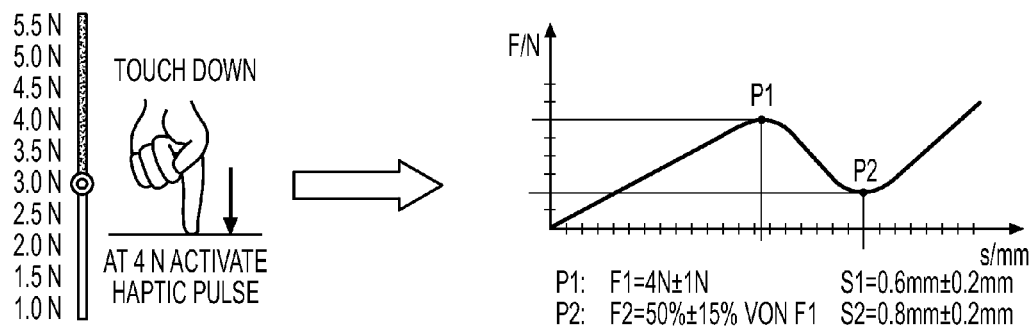
FIGS. 8A, 8B, 8C, and 8D provide graphs illustrating exemplary tactile feedback responses for different touch events (e.g., touch-down (e.g, engage), lift-off (e.g., release), end-of-list, and press-and-hold, respectively) associated with an exemplary multi-function tactile haptic switch panel, consistent with certain disclosed embodiments.
Figure 8B:
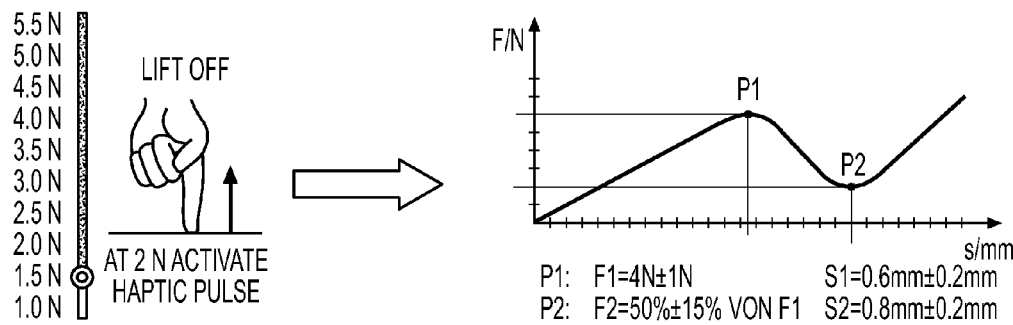
Figure 8C:
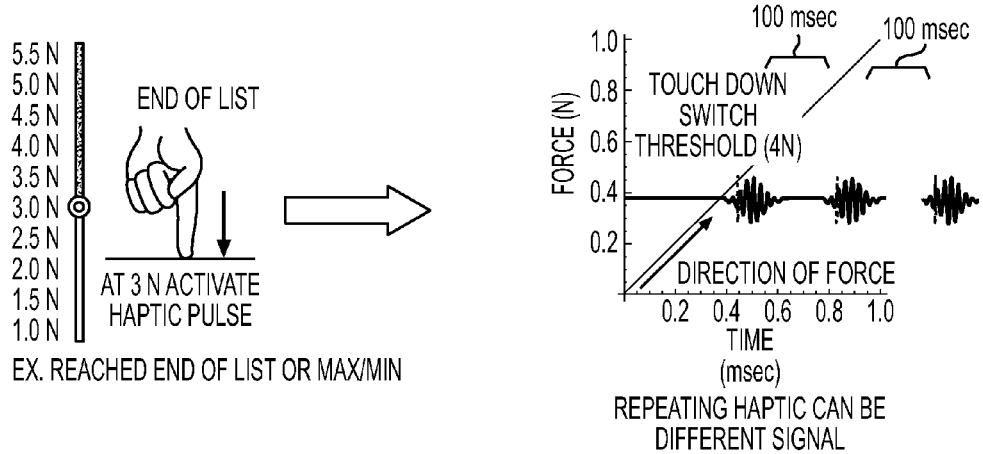
Figure 8D:
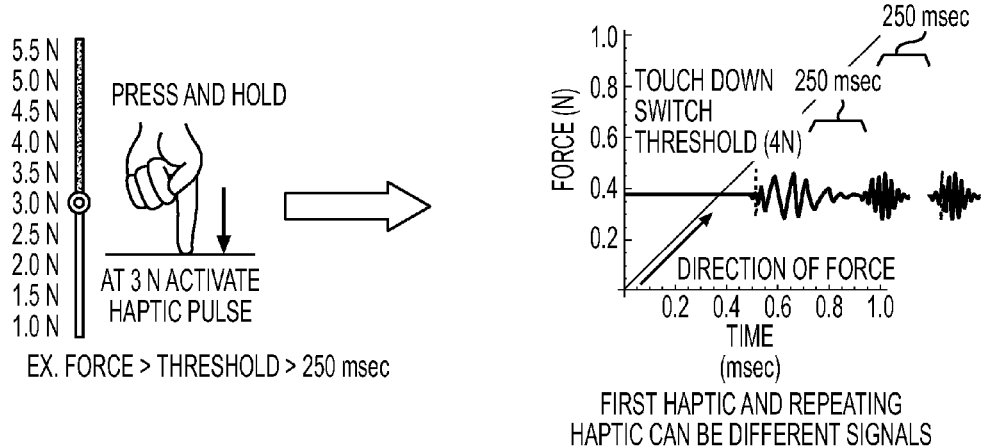

As illustrated in FIGS. 7, 8A, 8B, and 8C, the force-based switch panel may be used to sense a position and magnitude of force applied to the force-based sensor system. In other words, the force-based sensor system may be configured to sense the position of the applied force in either one dimension (e.g., the X- or Y-direction) or two dimensions (e.g., the X- and Y-directions), as well of as the magnitude of the applied force (e.g., force in the Z-direction). The force-based sensor system can also be configured to sense the time that a force is applied at a particular location. In response to the magnitude, location, and/or duration of the applied force, the force-based switch panel may be configured to generate a haptic and/or audible feedback signal responsive to the detected force. As shown in FIGS. 8A, 8B, and 8C, each touch event (e.g., touch-down, lift-off, and hold-down) may be initiated by a different user interaction (e.g., different force value and/or duration of the touch) and, accordingly, may trigger different haptic and/or audible output feedbacks being provided to the user.

Figure 9:
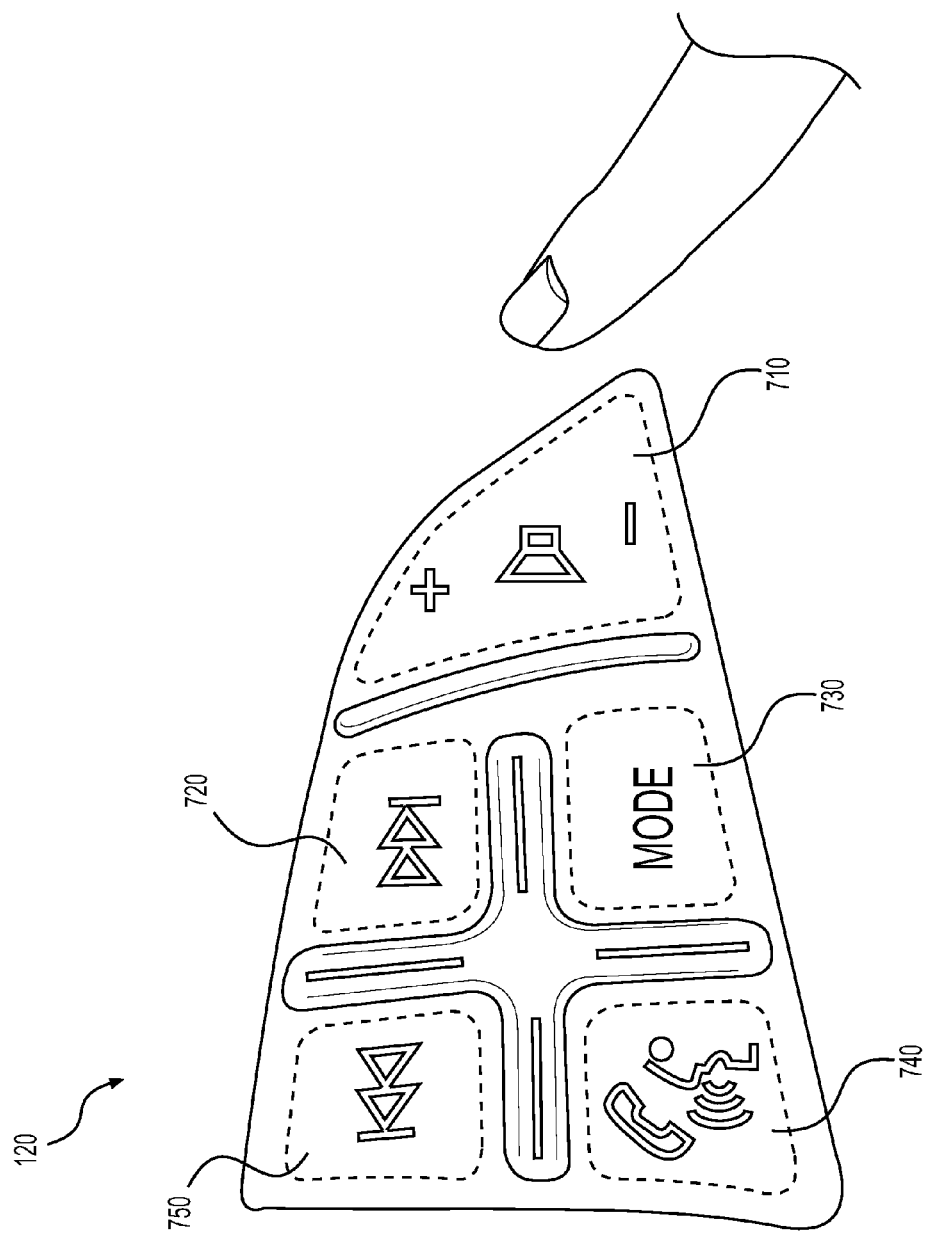
FIG. 9 illustrates an exemplary user-interface layout and corresponding virtual input area(s) as provided for in certain disclosed embodiments.
Figure 10:
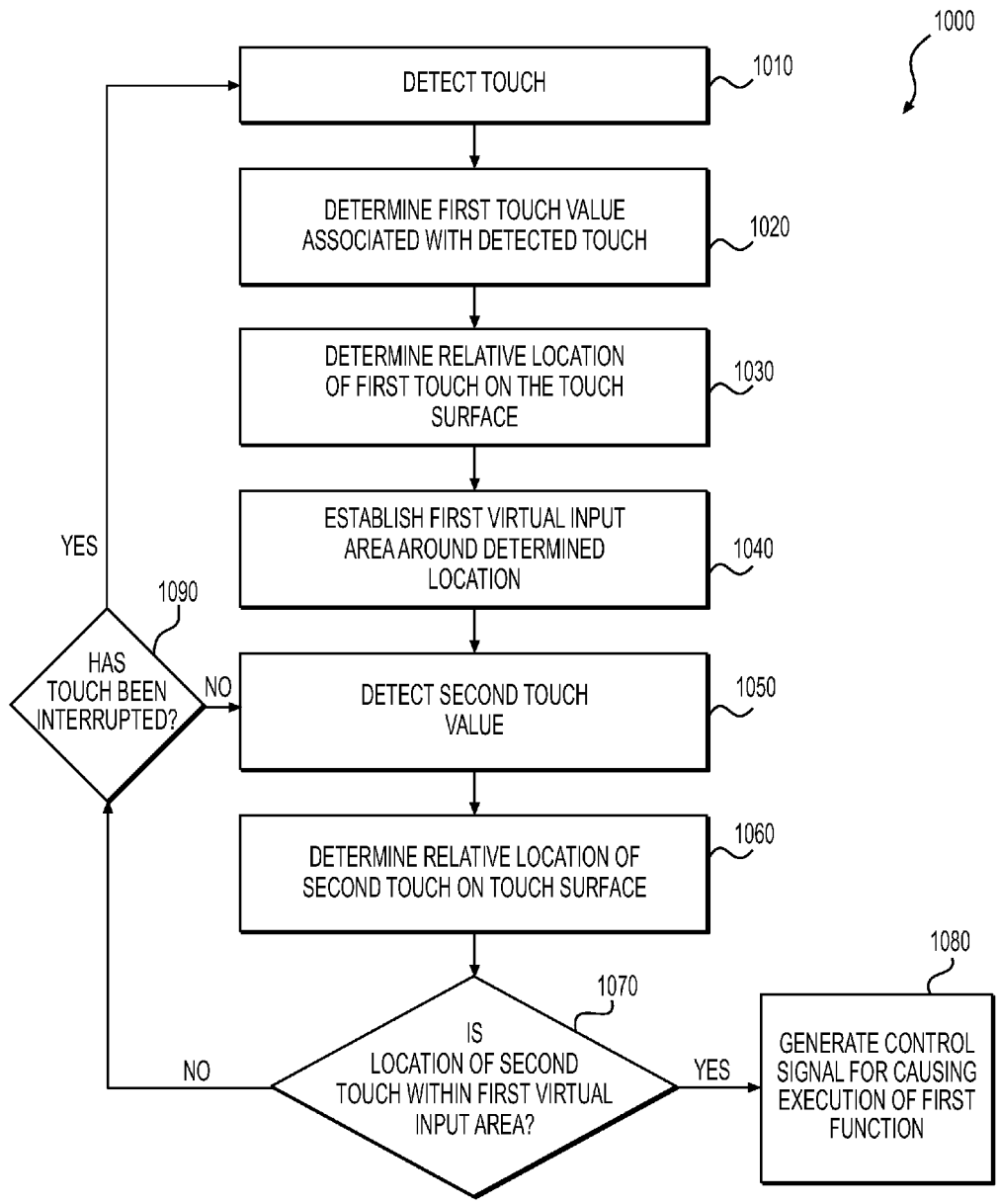
FIG. 10 provides a flowchart illustrating an exemplary process for locking an input area associated with a force-based touch interface consistent with the disclosed embodiments.

Systems and methods consistent with the disclosed embodiments provide a solution for detecting a location of a touch on the touch surface of the force-based switch panel 120 and limiting the effective user input area associated with the touch surface to a virtual area surrounding the location of the detected touch. As such, the presently disclosed embodiments are configured to minimize accidental touches that may be caused, for example, by situations in which a vehicle driver's attention is focused away from the touch surface of the force-based switch panel 120—such as when the driver properly has his/her eyes on the road. FIGS. 9 and 10 provide a diagram illustrating the establishment of virtual input areas that may be associated with the force-based switch panel 120 and a flowchart that illustrates an exemplary process for locking an input area associated with the force-based switch panel 120.

As illustrated in FIG. 9, force-based switch panel may include a plurality of virtual input areas 710, 720, 730, 740, 750. Virtual input areas are designated as "virtual" because the boundaries of these areas are not necessarily physical, but, rather, are designated in computer-generated coordinate space. According to one embodiment, virtual input area may be established as a designated, predetermined area surrounding one or more of the force-sensitive icons associated with the force-based switch panel 120. For example, one input area 710 may correspond with an area surrounding the "volume control" icon on a touch surface associated with a force-based switch panel 120. Other input areas may be designated around other individual inputs or groups of icons associated with the force-based switch panel such as, for example, an input area 720 surrounding the "fast-forward" or "track-forward" icon, an input area 730 surrounding the mode select icon, an input area 740 surrounding the voice activation icon, and/or an input area surrounding the "fast-rewind" or "track-rewind" icon. The input area(s), while corresponding to physical locations surrounding icons on the touch surface of force-based sensors, exist only in virtual (i.e., computer-generated) coordinate space and are designed to provide lateral boundaries by which force sensor(s) of the array of sensors that are underlying the touch surface may be selectively activated and/or deactivated.

As explained, the virtual area(s) are computer-generated coordinate locations that are associated with certain icons and/or locations on the surface of the touch panel of force-based switch panel 120. In some embodiments, the associations between the boundaries of the virtual area(s) and the icons/locations on the touch surface can be predetermined (i.e., they can be electronically programmed into the controller software prior to use by the user). In other embodiments, the associations between the boundaries of the virtual area(s) and the icons/locations on the touch surface can be established on an ad-hoc basis (i.e., after the user has initially contacted the touch surface) using boundaries and/or distance information that may be programmed in software. In certain embodiments, the virtual input area is configured to remain "activated" upon a user's initial contact with the touch surface until contact with the touch surface is interrupted (i.e., until a "lift-off" or "release").

Embodiments consistent with the present disclosure provide a solution for allowing the processor associated with a force-based switch panel to lock the location data when a "switch-on" force threshold is met and maintained (or exceeded). Once the threshold is met, the location data is ignored or locked until the switch off threshold is met. This allows for a users finger to move around due to vehicle vibration or other, without accidently activating a system. Having a switching system with the ability to distinguish the difference between intentional and unintentional activation, significantly reduces driver distraction. In other embodiments, location data is ignored until the switch on threshold is met. The location is read once the threshold is met, then updates to location are ignored until the switch off threshold is met and a new switch on threshold activation has occurred.

FIG. 10 provides a flowchart illustrating an exemplary process for locking an input area associated with a force-based touch interface consistent with the disclosed embodiments. The presently-disclosed process may be implemented by a processor associated with the force-based switch panel 120.

The process may commence upon detection of a touch at a touch surface of force-based switch panel 120 (Block 1010). For example, a driver or user associated with the force-based switch panel 120 may identify an icon or other user interface element, such as one shown in FIG. 9, provided on a touch panel of force-based switch panel 120. The user may press a touch surface of the touch panel with his/her finger, at which point a force sensor underlying the touch plate may detect the touch and register a force value associated with the detected touch.

Once a touch is detected, the touch value associated with the detected touch may be determined (Block 1020). According to one embodiment, the touch value may be determined by the processor coupled to the force sensor array underlying the touch plate. For example, the array of force sensors may each generate an output signal indicative of a force detected by the force sensor. The controller or processor that is coupled to the force sensor(s) may calculate a force value based on the plurality of force values received from each of the force sensor. The determined force value may be calculated in newtons, pounds, PSI, or any other appropriate unit that is indicative of applied force.

In addition to the force value, the processor may be configured to determine a relative location of the touch on the touch surface (Block 1030). For example, based on the touch values received from each of the force sensors, the controller or processor may calculate and estimate a geometric "center" of force of the detected touch. According to one embodiment, the estimation of the center of the force may be determined by performing a series of triangulation-type calculations based on the detected force values. For instance, the location may be determined as a relative distance based on the known locations of the force sensors that detected the largest force values among the array of force sensors. Alternatively or additionally, the estimated center of force may be less accurately estimated to correspond with the location of the force sensor that registered the largest touch value.

Once the force value and the location of the center of the force has been determined, a first virtual input area may be established around the determined location (Block 1040). As explained above with respect to FIG. 9, the virtual input area may be a predetermined area associated with the nearest icon to which the force was applied. In one embodiment, the processor may select the virtual input area by using the location of the center of the force to activate (or deactivate) force sensors surrounding the center of the location that are associated with virtual input area. For instance, the processor may determine that center of location of the force is associated with a force sensor located beneath the volume control virtual input area (area 170 of FIG. 9). Processor may determine, using information stored in a database, for example, which other sensors of the sensor array are located in the area associated with the volume control input area 170. The processor may establish the input area by effectively deactivating the sensors that are not designated as being associated with the volume control virtual input area 170 so that input values outside of the volume input area 170 are effectively ignored by the processor.

Once the virtual input area is established, a second touch value may be detected by the force-based switch panel 120 (Block 1050). Once detected, the processor may determine the relative location of the second touch on the touch surface (Block 1060), and determine whether the location of the second touch is within the established virtual input area (Block 1070). The processor may determine by comparing the location of the center of force of the second touch and determine whether is associated with the one of the sensors associated with one of the "activated" sensors associated with the virtual input area. If the second touch value is determined as being within the boundary of the virtual input area (Block 1070: Yes), the processor may generate a control signal for causing execution of a first function (Block 1080).

If on the other hand, the processor determines that the location of the second touch exceeds the boundary of the established virtual input area (Block 1070: No), processor may ignore the touch value and determine whether the touch has been interrupted (Block 1090). If the touch has been interrupted (e.g., by the user lifting his finger from the initial touch, Block 1090: Yes), the process may restart back at step 1010, with the second touch being established as the new touch. If, however, the processor determines that the first touch value has not been interrupted by, for example, the user having lifted his/her finger from the touch panel, the processor may determine that the second touch is unintentional and effectively ignore it, and proceed to Block 1050 to await a new touch value.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

It will be apparent to those skilled in the art that various modifications and variations can be made to the disclosed systems and methods for locking detected touch location in a force-based haptic multifunction switch panel. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for locking an input area associated with a force-based touch interface, comprising:
   detecting a first touch value associated with a first user interaction with a first area of a touch interface, the first touch value including information indicative of a location of the first area of the touch interface;
   establishing a first virtual input area based on the location, wherein a boundary associated with first virtual input area is contained within a boundary defined by the touch interface;
   detecting a second touch value associated with a second user interaction with a second area of the touch interface;
   in response to determining that a location associated with the second touch value is within the first virtual input area, generating a control signal for causing execution of a first function based on the determination that the second touch value is within the first virtual input area,
   in response to determining that the location associated with the second touch value is outside of the first virtual input area and the first touch value has not been interrupted, ignoring the second touch value; and
   in response to determining that the location associated with the second touch value is outside of the first virtual input area and the first touch value has been interrupted, establishing a second virtual input area based on the location of the second touch value, wherein a boundary associated with the second virtual input area is contained within the boundary defined by the touch interface and is separate and spaced apart from the first virtual input area.

2. The method of claim 1, further comprising:
   detecting a third touch value associated with a third user interaction with the touch interface;
   determining that a location associated with third touch value is not within the first virtual input area and the second touch value has not been interrupted; and
   ignoring the third touch value.

3. The method of claim 1, wherein an interruption comprises the first user interaction with the touch interface being released.

4. The method of claim 1, wherein the first virtual input area is substantially similar in size and shape to the first area of the touch interface.

5. The method of claim 1, further comprising transmitting a first feedback signal in response to the detection of the first touch value, the first feedback signal configured to cause generation of first haptic feedback and first audio feedback.

6. The method of claim 5, further comprising transmitting a second feedback signal in response to the detection of the second touch value, the second feedback signal configured to cause generation of second haptic feedback and second audio feedback.

7. The method of claim 6, wherein the second haptic feedback and the second audio feedback are substantially similar to the first haptic feedback and first audio feedback, respectively.

8. The method of claim 5, wherein the first feedback signal is transmitted to an acoustic actuator that is configured to generate both the first haptic feedback and first audio feedback.

9. A method for limiting an input area associated with a force-based haptic touchscreen based on a detected touch location, the method comprising:

establishing a first virtual input area corresponding to a physical area of a haptic touchscreen;

detecting a first touch event associated with the first virtual input area, the first touch event indicative of a user interaction with a first portion of the physical area of the haptic touchscreen;

establishing a second virtual input area responsive to the detected first touch event, the second virtual input area corresponding to the first portion of the physical area;

detecting a second touch event based on a second user interaction with the physical area of the haptic touchscreen;

in response to the second touch event being within the second virtual input area, generating a signal for controlling a function associated with the second virtual input area;

in response to the second touch event being outside of the second virtual input area and the first touch event being uninterrupted, ignoring the second touch event; and in response to the second touch event being outside of the second virtual input area and the first touch event being interrupted, establishing a third virtual input area, the third virtual input area corresponding to a second portion of the physical area associated with a location of the second touch event.

10. The method of claim 9, wherein the first touch event associated with the first portion of the physical area is associated with a first set of functions, and wherein the first set of functions comprises the function associated with the second virtual input area.

11. The method of claim 10, wherein the function is a first function, and the second portion of the physical area is associated with a second set of functions, the method further comprising:

detecting a third touch event based on a third user interaction within the third virtual input area; and in response to detecting the third touch event within the third virtual input area, generating a signal for controlling a second function associated with the third virtual input area, the second function being within the second set of functions.

12. The method of claim 9, wherein the second virtual area is a sub-area contained within boundaries associated with the first virtual input area.

13. The method of claim 9, wherein an interruption comprises the first user interaction with the physical area of the haptic touchscreen being released.

14. The method of claim 9, wherein the second virtual input area is substantially similar in size and shape to the first portion of the physical area of the haptic touchscreen.

15. A force-based haptic human-machine interface, comprising:

a touch plate having a touch surface;

at least one force sensor coupled to the touch plate and configured to detect a force applied to the touch surface;

an actuator coupled to the touch plate and configured to deliver a mechanical output to the touch plate;

a processor coupled to the at least one force sensor and the actuator, wherein the processor is in communication with a memory, and the processor executes computer-readable instructions stored on the memory, the instructions causing the processor to:

determine a first touch value associated with a first user interaction with a first area of the touch surface, the first touch value including information indicative of a location of the first area of the touch surface;

establish a first virtual input area based on the location, wherein a boundary associated with first virtual input area is contained within a boundary defined by the touch surface;

detect a second touch value associated with a second user interaction with the touch surface;

in response to determining that a location associated with the second touch value is within the first virtual input area, generate a control signal for causing execution of a first function based on the determination that the second touch value is within the first virtual input area;

in response to determining that the location associated with the second touch value is outside of the first virtual input area and the first touch value has not been interrupted, ignore the second touch value; and in response to determining that the location associated with the second touch value is outside of the first virtual input area and the first touch value has been interrupted, establish a second virtual input area based on the location of the second touch value, wherein a boundary associated with the second virtual input area is within contained within the boundary defined by the touch surface, and the second virtual input area is separate and spaced apart from the first virtual input area.

16. The force-based haptic human-machine interface of claim 15, wherein the at least one force sensor includes a plurality of force sensors, each of which is coupled to the touch plate and configured to detect a respective portion of the force applied to a corresponding area of the touch surface based on the location of the sensor.

17. The force-based haptic human-machine interface of claim 15, wherein the actuator is an acoustic actuator and the processor is further configured to transmit, to the actuator, a first feedback signal in response to the detection of the first touch value, the first feedback signal configured to cause the actuator to generate a first haptic feedback and a first audio feedback.

18. The force-based haptic human-machine interface of claim 17, wherein the instructions further cause the processor to transmit, to the actuator, a second feedback signal in response to the detection of the second touch value, the second feedback signal configured to cause the actuator to generate a second haptic feedback and a second audio feedback.

19. The force-based haptic human-machine interface of claim 18, wherein the second haptic feedback and the second audio feedback are substantially similar to the first haptic feedback and first audio feedback, respectively.

* * * * *